J. B. HOWELL.
SANITARY DRINKING DEVICE.
APPLICATION FILED OCT. 4, 1910.
1,021,677.
Patented Mar. 26, 1912.
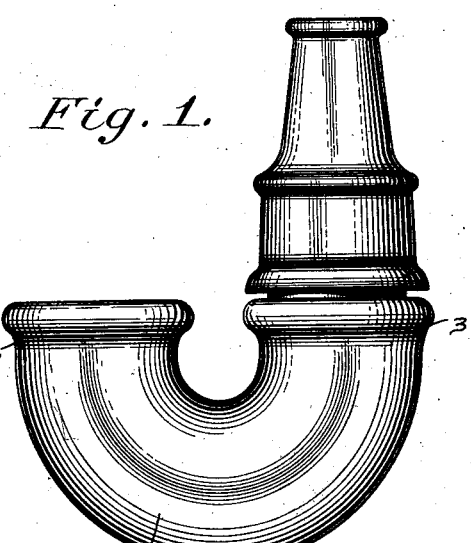
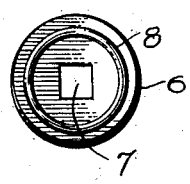
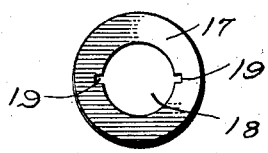
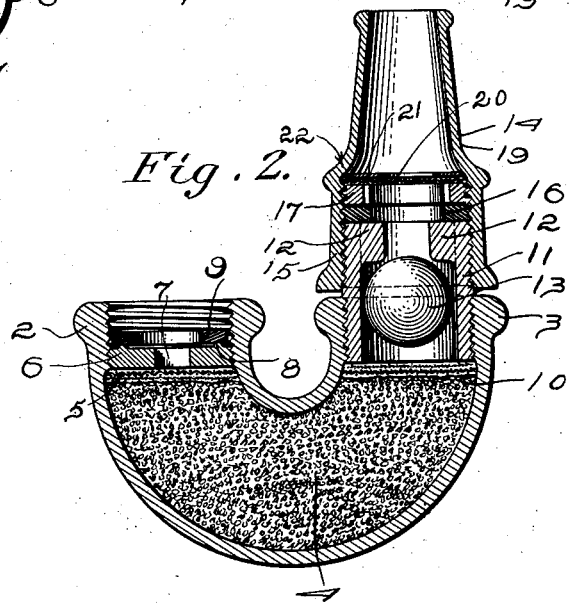
WITNESSES
INVENTOR
Joseph B. Howell.
By Attorney.

UNITED STATES PATENT OFFICE.

JOSEPH B. HOWELL, OF WALPOLE, MASSACHUSETTS.

SANITARY DRINKING DEVICE.

1,021,677.      Specification of Letters Patent.     Patented Mar. 26, 1912.

Application filed October 4, 1910. Serial No. 585,255.

*To all whom it may concern:*

Be it known that I, JOSEPH B. HOWELL, a citizen of the United States, residing at Walpole, in the county of Norfolk and State of Massachusetts, have invented certain new and useful Improvements in Sanitary Drinking Devices, of which the following is a specification, reference being had therein to the accompanying drawing.

This invention relates to filters, and the principal object of the same is to provide a filter that can be readily attached to a source of water supply and which is provided with means for thoroughly cleaning the water passing through the same and also with means for reducing the pressure of the water so that the discharge of the same will be under less pressure than the pressure of the same when entering the filter.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved filter. Fig. 2 is a central vertical sectional view thereof. Fig. 3 is a top plan view of a washer in the inlet end of the filter. Fig. 4 is a similar view of a washer in the discharge end of the filter.

Referring to the accompanying drawings by numerals, it will be seen that the improved filter comprises a body 1 that is preferably formed of a length of pipe bent or cast into a semi-circular shape, said body being provided with an internally threaded inlet end 2 and a similar discharge end 3.

Filtering material 4, such as quartz, or other granular material, is placed in the body and fills the same up to the bases of the threads at the ends therein. In the inlet end 2, a screen 5 is placed on the filtering material 4, and an externally threaded metallic washer 6 is screwed into said end 2 and holds the screen 5 to the filtering material 4. Said washer 6 is provided with a central opening 7 that is preferably square, and with a circular rib 8 in its upper surface which "bites" into a gasket 9 when the inlet end 2 is engaged with a faucet or other source of water supply.

A screen 10 is seated on the filtering material 4 at the discharge end 3 of the filter and an externally threaded nipple 11 which engages said end 3, holds the screen 10 on the filtering material. Said nipple projects beyond the discharge end 3 and internally is provided with a pair of oppositely disposed lugs 12 at the outer end and which form seats for a ball 13 which is movable in the nipple between the screen 10 and said lugs 12.

A nozzle 14, has an internally threaded body 15 which engages the projected end of the nipple 11. A gasket 16 is seated on the outer end of nipple 11 and is held thereon by the externally threaded washer 17 that is carried by the nozzle body 15. Said washer 17 is provided with a central opening 18 provided with oppositely disposed notches 19. A screen 20 is seated on washer 17, and a washer 21 is seated on the screen 20. Said washer 21 and screen 20 are held to the washer 17 by the inwardly projecting rounded portion 22 of the nozzle 14.

As will be obvious the washer 6 can be readily removed by engaging a suitable tool with the opening 7 therein, and the washer 17 can also be readily removed by engaging a suitable tool with the notches 19 thereof. It will also be seen that the ends of the body 1 being of the same size, the parts carried thereby can be readily interchanged.

In use, it will be seen that the water passing through the filter is thoroughly screened and filtered and that the ball 13 causes the water to be discharged at a much less pressure than the pressure of the same when admitted. It will also be seen that the semi-circular shape of the body 1 causes the waste water to flow to the center of the body so that no water is in the discharge or inlet end when the filter is not in operation.

What I claim as my invention is:—

1. A filter comprising a body provided with internally threaded inlet and discharge ends, filtering material in said body, a screen seated on said material in the inlet end of said body, a threaded washer engaging the threads of the inlet end and holding said screen to said filtering material, a gasket seated on said washer, a screen on the filtering material at the discharge end of the body, a nipple engaging said end and provided with internal lugs, a ball movable in said nipple between said lugs and screen, and a nozzle carried by said nipple.

2. A filter comprising a body provided with inlet and discharge ends, said ends being internally threaded, an externally threaded nipple engaging the discharge end, pressure reducing means in said nipple, said pressure reducing means comprising spaced lugs formed in said nipple, and a ball movable in the nipple and adapted to bear against said lugs in its raised position, a nozzle provided with an internally threaded body for engaging said nipple, a gasket seated on the outer end of the nipple, a washer within said body and seated on said gasket, a screen on said washer, a washer on said screen, and filtering material in said body.

In testimony whereof I hereunto affix my signature in presence of two witnesses.

JOSEPH B. HOWELL.

Witnesses:
James S. Duval,
William Gillie.

---

Copies of this patent may be obtained for five cents each, by addressing the "Commissioner of Patents, Washington, D. C."